(12) United States Patent
Reeves

(10) Patent No.: US 7,377,714 B2
(45) Date of Patent: May 27, 2008

(54) MECHANICAL JOINT FOR COLLAPSIBLE STRUCTURES

(76) Inventor: Francis J. Reeves, 357 Council Oak Dr., Severn, MD (US) 21144

( * ) Notice: Subject to any disclaimer, the term of this patent is extended or adjusted under 35 U.S.C. 154(b) by 34 days.

(21) Appl. No.: 10/405,475

(22) Filed: Apr. 3, 2003

(65) Prior Publication Data
US 2004/0197138 A1 Oct. 7, 2004

(51) Int. Cl.
*A63B 63/00* (2006.01)

(52) U.S. Cl. .................. 403/206; 403/102; 403/232.1; 403/238; 403/244; 473/471

(58) Field of Classification Search ............... 403/206, 403/215, 232.1, 233–235, 237–239, 244, 403/302, 381, 382, DIG. 11, 99, 102, 220, 403/221, 223, 224, 6, 10, 53; 24/459, 260, 24/129 A, 462, 130; 29/453, 525.3; 72/369; 473/471, 478; 135/119, 913; 52/63
See application file for complete search history.

(56) References Cited

U.S. PATENT DOCUMENTS

| | | | | |
|---|---|---|---|---|
| 653,796 A * | 7/1900 | Ettinger | .................... | 242/586.2 |
| 884,634 A * | 4/1908 | Bragg | ......................... | 138/123 |
| 1,036,143 A * | 8/1912 | Phillips | | |
| 1,405,312 A * | 1/1922 | Miller | ......................... | 24/462 |
| 1,995,420 A * | 3/1935 | Fischer | ........................ | 403/274 |
| 2,165,472 A | 7/1939 | Friedman | | |
| 2,408,907 A * | 10/1946 | Booth | ......................... | 403/380 |
| 2,834,321 A * | 5/1958 | Duefrene | ..................... | 29/453 |
| 2,870,619 A * | 1/1959 | Greczin | ........................ | 138/123 |
| 2,881,017 A * | 4/1959 | Millar, Jr. | .................... | 403/340 |
| 3,223,098 A * | 12/1965 | Dole, Jr. | ...................... | 135/126 |
| 3,286,804 A * | 11/1966 | Bernheim | ....................... | 193/7 |
| 3,374,986 A * | 3/1968 | McElroy et al. | ............ | 248/251 |
| 3,380,767 A * | 4/1968 | Barth | ......................... | 403/102 |
| 3,405,721 A * | 10/1968 | Crosier et al. | .............. | 135/130 |

(Continued)

FOREIGN PATENT DOCUMENTS

DE      200 19 122      3/2001

(Continued)

*Primary Examiner*—Daniel P. Stodola
*Assistant Examiner*—Ernesto Garcia
(74) *Attorney, Agent, or Firm*—Foley & Lardner LLP

(57) ABSTRACT

A mechanical joint is formed from a hollow structure of material that can be shaped so that bringing opposite sides of the external walls forming the hollow together forms a socket. For example, by compressing together opposite external sides of a hollow structure, such as a tube, a socket with a continuous double wall is formed. The socket is configured to provide a snap fit with a moveable member. A flexible member is positioned in the socket and attached to the moveable member, so that the moveable member can be controlled for placement in an out of the socket. The flexible member may also twist to permit the moveable member to be located in any position necessary to allow the moveable member to be engaged in the socket or disengaged from the socket, reducing the need for precise component tolerances. The joint is useful in structures that have multiple configurations. For example, the joint finds application in structures such as portable game goals, where it is desirable for the structure to collapse from an erect position for game play into a collapsed configuration for transport.

24 Claims, 15 Drawing Sheets

U.S. PATENT DOCUMENTS

| | | | | |
|---|---|---|---|---|
| 3,448,748 A | * | 6/1969 | Walrave | 135/127 |
| 3,508,770 A | * | 4/1970 | Cassel | 403/234 |
| 4,063,830 A | * | 12/1977 | Ban | 403/102 |
| 4,183,455 A | * | 1/1980 | Reynolds | 228/170 |
| 4,376,417 A | * | 3/1983 | Blonski | 403/274 |
| 4,507,844 A | * | 4/1985 | Renaud | 403/242 |
| 4,603,904 A | * | 8/1986 | Tolleson et al. | 297/296 |
| 4,718,700 A | * | 1/1988 | Horch et al. | 285/133.5 |
| 4,865,064 A | * | 9/1989 | Parsons et al. | 403/102 |
| 4,875,794 A | * | 10/1989 | Kern, Jr. | |
| 4,928,634 A | * | 5/1990 | Voigt | 119/805 |
| 4,979,531 A | * | 12/1990 | Toor et al. | 403/99 |
| 5,070,597 A | * | 12/1991 | Holt et al. | 428/34.9 |
| 5,088,675 A | * | 2/1992 | Perrault et al. | 248/327 |
| 5,178,583 A | * | 1/1993 | Rankin | 403/102 |
| 5,289,792 A | * | 3/1994 | Forrest et al. | 114/39.29 |
| 5,332,281 A | * | 7/1994 | Janotik et al. | 52/696 |
| 5,539,957 A | * | 7/1996 | Schmidt | 403/102 |
| 5,566,952 A | * | 10/1996 | Mullin et al. | 273/400 |
| 5,649,866 A | * | 7/1997 | Balwanz | 472/118 |
| 5,678,824 A | * | 10/1997 | Fortier et al. | 273/407 |
| 5,681,231 A | | 10/1997 | Reeves | |
| 5,746,533 A | * | 5/1998 | Schmidt | 403/102 |
| 6,000,175 A | * | 12/1999 | Gale et al. | 52/63 |
| 6,014,794 A | * | 1/2000 | McCoy | 24/300 |
| 6,164,504 A | * | 12/2000 | Richard | 223/94 |
| 6,220,776 B1 | | 4/2001 | Reeves | |
| 6,241,630 B1 | * | 6/2001 | Alberti | 403/102 |
| 6,247,699 B1 | * | 6/2001 | Macaluso | 273/400 |
| 6,292,987 B1 | * | 9/2001 | Combes | 24/460 |
| 6,561,931 B1 | | 5/2003 | Reeves | |
| 6,652,395 B2 | * | 11/2003 | Goldwitz | 473/478 |
| 6,711,783 B2 | * | 3/2004 | LeMole | 403/102 |

FOREIGN PATENT DOCUMENTS

| | | | |
|---|---|---|---|
| EP | 213250 A1 | * | 3/1987 |
| FR | 1247439 A | * | 10/1960 |
| GB | 1525362 A | * | 9/1978 |

* cited by examiner

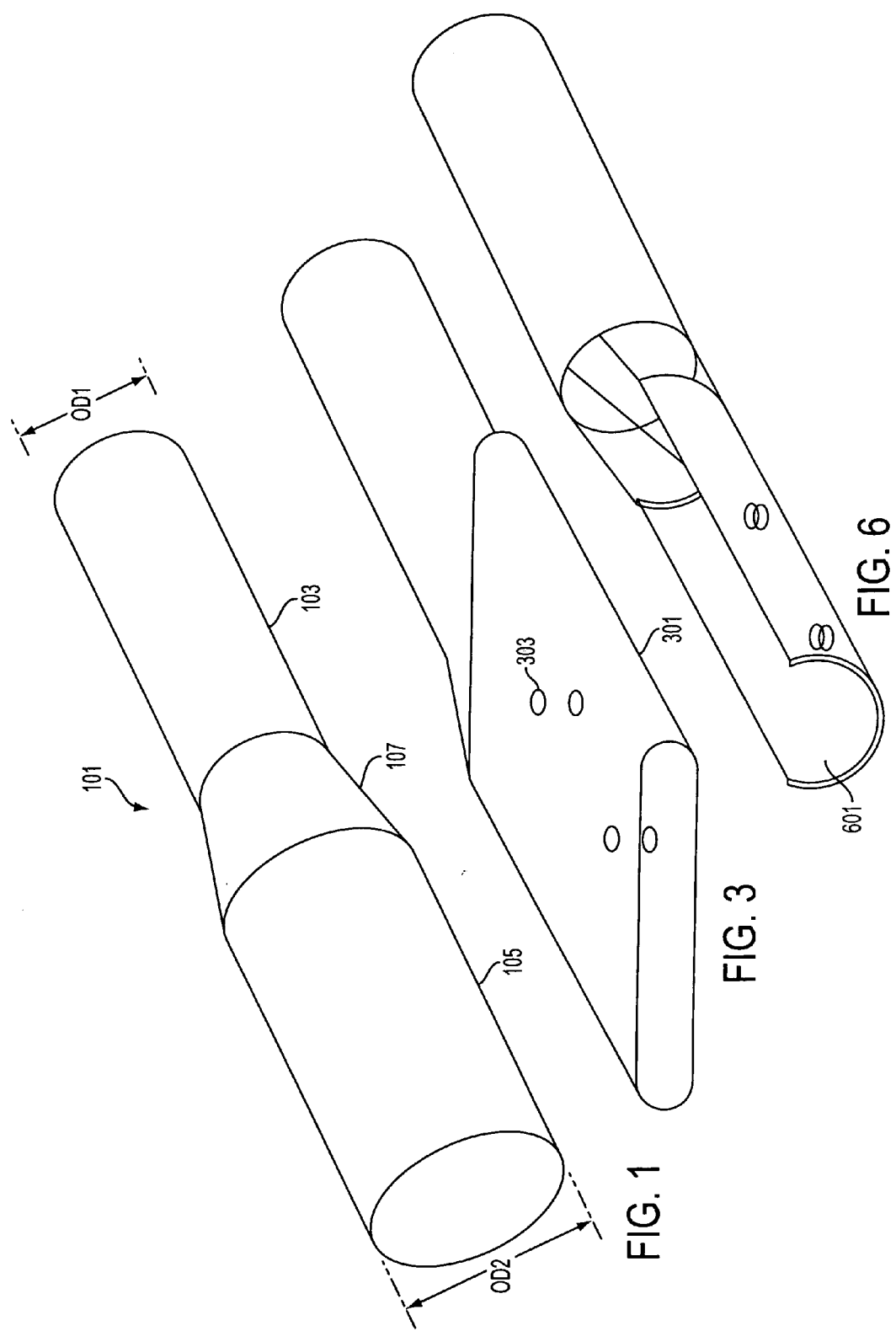

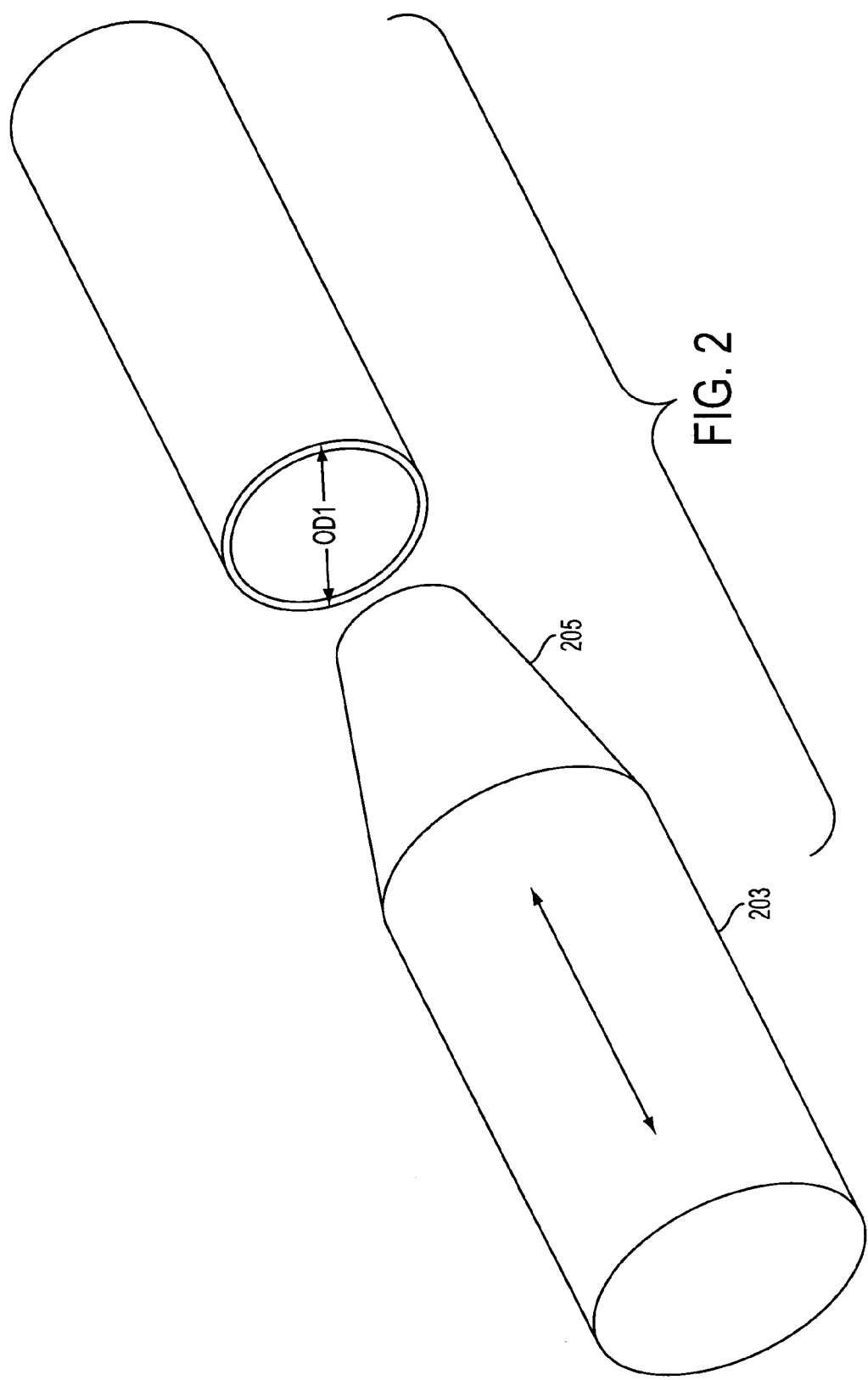

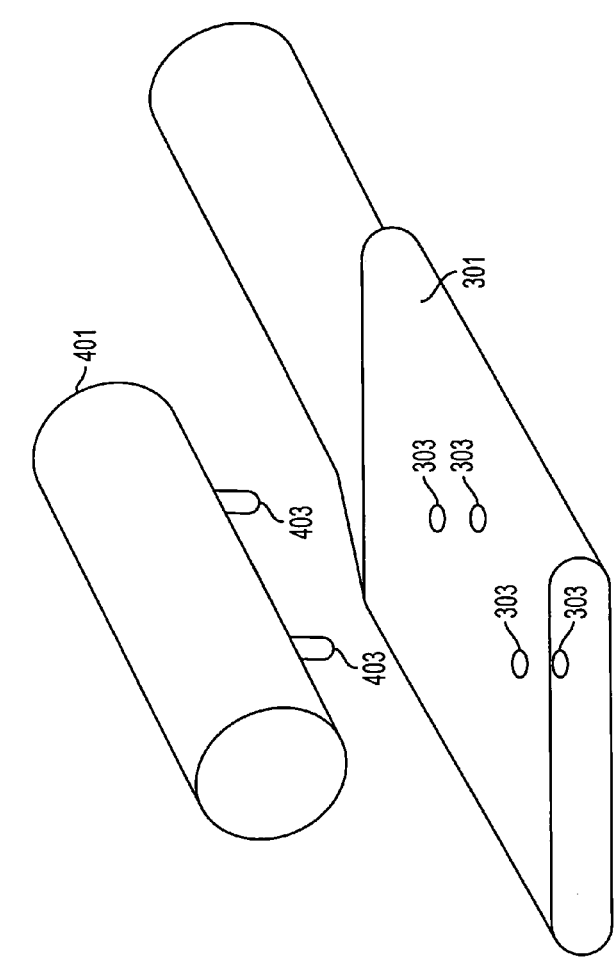
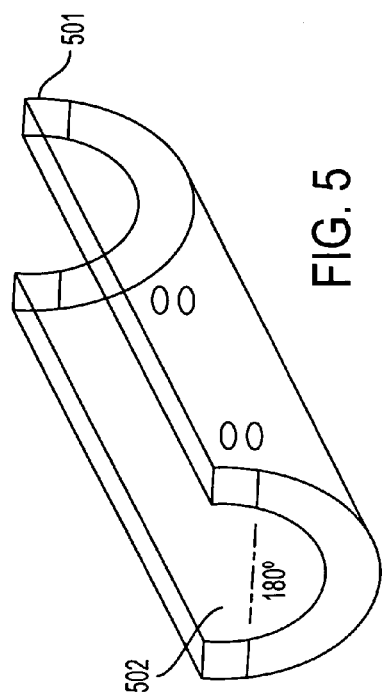

MECHANICAL JOINT FOR COLLAPSIBLE STRUCTURES

This application is related to application Ser. No. 08/288,309 filed on Aug. 10, 1994, now issued as U.S. Pat. No. 5,681,231, application Ser. No. 09/179,403, filed on Oct. 27, 1998, now issued as U.S. Pat. No. 6,220,776, and application Ser. No. 08/958,346 filed on Oct. 27, 1997, now issued as U.S. Pat. No. 6,561,931.

BACKGROUND OF THE INVENTION

The invention relates to a mechanical joint for collapsible structures. U.S. Pat. No. 5,681,231 discloses a collapsible structure, in particular a game goal, with an elbow joint having an arm with a gap therein. A frame member inserts into the gap in a fixed or upright position and is removed from the gap to collapse the structure. A flexible member connected to the frame member and the portion of the elbow having the gap allows the frame member to move into and out of the joint while remaining connected to the overall structure.

U.S. Pat. No. 6,220,776 discloses a corner or straight joint for a collapsible structure with a socket portion that accommodates a moveable member with multiple degrees of motion. In this joint the moveable member is connected with a threaded or otherwise twistable connection to the rod of a heim joint which rotates on a roll pin. The moveable portion moves in and out of the socket portion to erect and collapse the structure, as frame members are attached to the fixed and moveable portions of the joint.

SUMMARY OF THE INVENTION

A joint according to the invention herein comprises a tube having a wall compressed on itself along a portion of its length. This forms a socket, which is double walled.

BRIEF DESCRIPTION OF THE DRAWINGS

The invention is described in further detail herein with reference to the drawings in which:

FIG. 1 illustrates a tube section with a portion having an outer diameter wider at one end tapering to a portion with a smaller outer diameter used in a method of forming a joint according to the invention.

FIG. 2 illustrates a tapered end ramming device that can be used as one approach to forming the tube section of FIG. 1.

FIG. 3 illustrates the tube of FIG. 1 with its wider outer diameter portion flattened.

FIG. 4 illustrates a shaping punch for use in shaping the area at the end of the tube in FIG. 3 of the flattened end.

FIG. 5 illustrates a U-shaped die for use with the shaping punch of FIG. 4 to form a joint socket portion according to the invention.

FIG. 6 illustrates a joint socket portion according to the invention formed integrally with a tube.

DETAILED DESCRIPTION OF AN EMBODIMENT OF THE INVENTION

Figure 7:
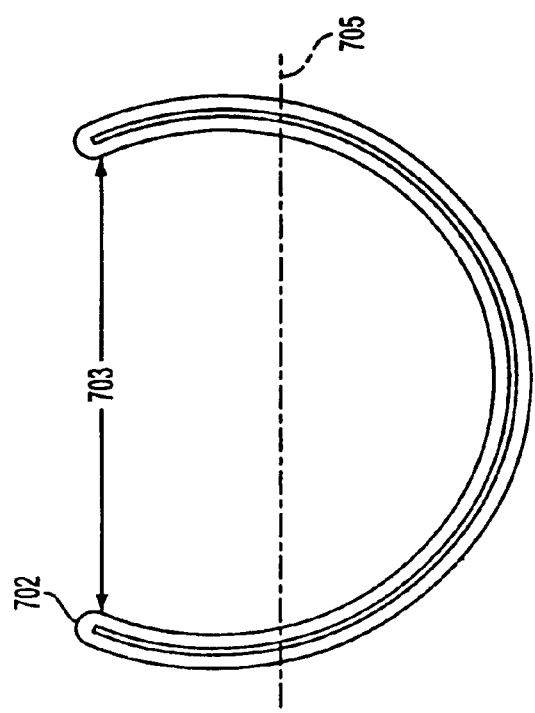
FIG. 7 shows in side view a joint socket portion according to the invention having a double wall.

For ease of manufacture, a joint according to the invention is preferably formed from a material that can be shaped by hammering or other mechanical manipulation at room temperature. However, those of ordinary skill will recognize that the joint according to the invention can also be formed by other techniques appropriate to the strength, hardness and other characteristics of the material used to form the joint. Such techniques include, but are not limited to heating the material to form it into the desired shape, extrusion techniques and molding techniques. For convenience, the description herein assumes that the material used can be manipulated at room temperature into the shapes disclosed herein. Those of ordinary skill will further recognize that the invention is not limited to joints having the specific shapes disclosed herein, which are provided by way of example and not limitation, as other shapes may be employed which produce the joint according to the invention.

FIG. 1 shows a tube 101 that has a first tube portion 103 with a first outer diameter OD1 and a second tube portion 105 with a larger outer diameter OD2. Between the first tube portion 103 and the second tube portion 105 is a transitional portion 107. The outer diameter of transitional portion (or region) 107 gradually changes from the wider outer diameter OD2 of second tube portion 105 to the smaller outer diameter OD1 of first tube portion 103. As noted above, a tube can be formed in this configuration or a tube with an original outer diameter OD1 can be mechanically manipulated into a shape as shown in FIG. 1.

FIG. 2 illustrates a ramming device 201 with a shaft 203 and a generally cone shaped end 205 that can be inserted into a tube having an outer diameter OD1, such as tube 101, and hammered into the tube to cause the tube to expand into the shape shown in FIG. 1. Those of ordinary skill will further recognize that the outer diameters, OD1 and OD2 can be any dimensions suitable for the application.

FIG. 3 illustrates tube 101 from FIG. 1 with its second tube portion 105 and its transitional portion 107 flattened as shown at area 301. FIG. 3 also shows guide holes 303 drilled into the flattened portion 301. The purpose of the guide holes is to assure proper alignment of a shaping punch 401, as shown in FIG. 4, used with a substantially U-shaped die 501, as shown in FIG. 5, to form flattened portion 301 into a socket.

Flattened portion 301 is placed between die 501 and shaping punch 401. Shaping punch 401 in FIG. 4 has guide pins 403 for insertion into guide holes 303. When guides pins 403 are inserted onto guide holes 303 and shaping punch 401 is pressed onto the flattened area 301, area 301 takes on the shape of the U-shaped die and completes being folded onto itself to form a socket portion 601 in the tube, as shown in FIG. 6. Folding the tube onto itself results in a double walled socket which is fully integrated with the tube from which it is formed. Those of ordinary skill will recognize that bringing opposite sides of a hollow structure having a variety of shapes, such as a square, rectangle or circular shape, toward each other such as by compressing, molding or extruding will result in a double walled socket according to the invention.

Preferably, U-shaped die 501 has upwardly extending walls 502. These upwardly extending walls 502 in die 501 cause flattened tube 301 portion to be bent into a double walled socket at a point on the circumference of the tube that is beyond a centerline of the tube when viewed from the tube's end. As a result, when the punch is removed from the die, tension resulting from the curvature of the tube causes the newly formed double walled portion 601 to partially close in on itself, resulting in a socket opening that will create a snug "snap fit" when tubes of the same outer diameter are inserted therein.

FIG. 7 illustrates the double walled portion of the socket in a side view. Since the double walled portion is formed by folding a tube onto itself, the double walled portion is continuous. As discussed above, the presence of upwardly extending walls 502 in die 501 causes the tube to bend at points 702 which are above a centerline on the tube as seen from the side view in FIG. 7. The curvature of the tube causes the width of opening 703 to be less than the maximum inner width of the tube at its centerline 705. As a result, a tube whose outer diameter is approximately the same as the inner diameter of the tube used to form the socket will form a fitted region having a snug "snap fit" with the socket.

Figure 8:
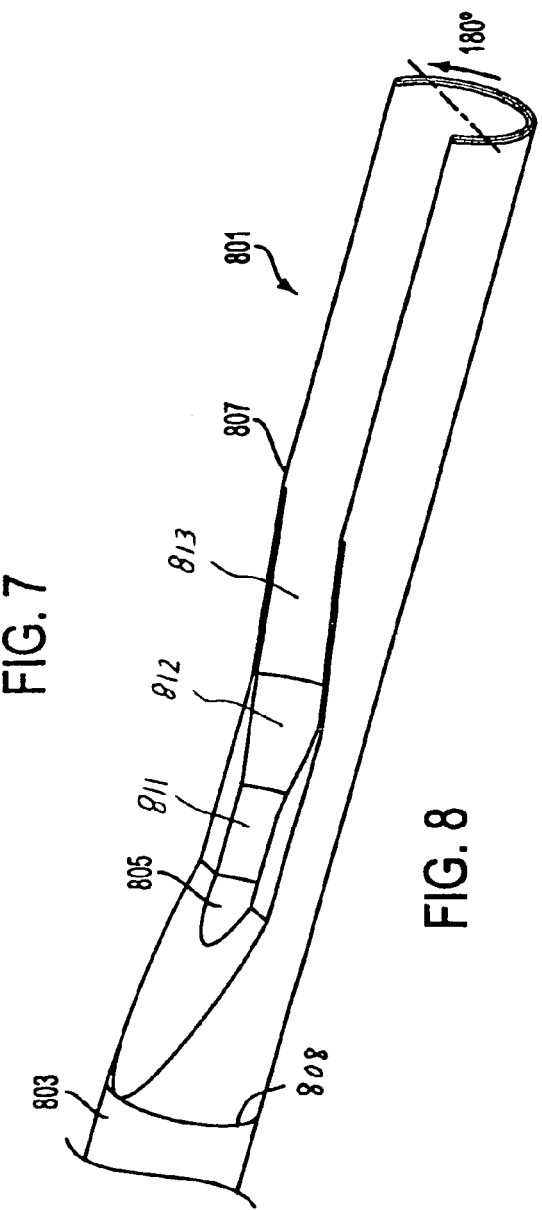
FIG. 8 is another view of a joint socket portion according to the invention illustrating various features thereof.

FIG. 8 illustrates the various structural features of the socket formed as a result of enlarging the outer diameter of a tube to have a portion larger than its original outer diameter and a transitional portion extending from the wider portion to the original outer diameter and compressing these portions to fold on themselves with the punch and die, as discussed above. The socket 801 in FIG. 8 extends from the original outer diameter portion 803 through a generally spoon shaped concave depression 805 which is open at the top, to a fitted snap fit region 807. The socket 801 includes a first transition region 811 having a substantially constant width, a second transition region 812 having a width that gradually increases in relation to the distance from the concave depression 805 of the socket 801, and a third transition region 813 provided between the second transition region 812 and the snap fit region 807. The sidewall height of the third transition region gradually increases in relation to the distance from the concave depression 805 of the socket 801. The generally spoon shaped concave depression 805 results from bending which occurs in the transition portion when the wider outer diameter portion is folded on itself to form the double walled portion snap fit region 807.

Figure 9:
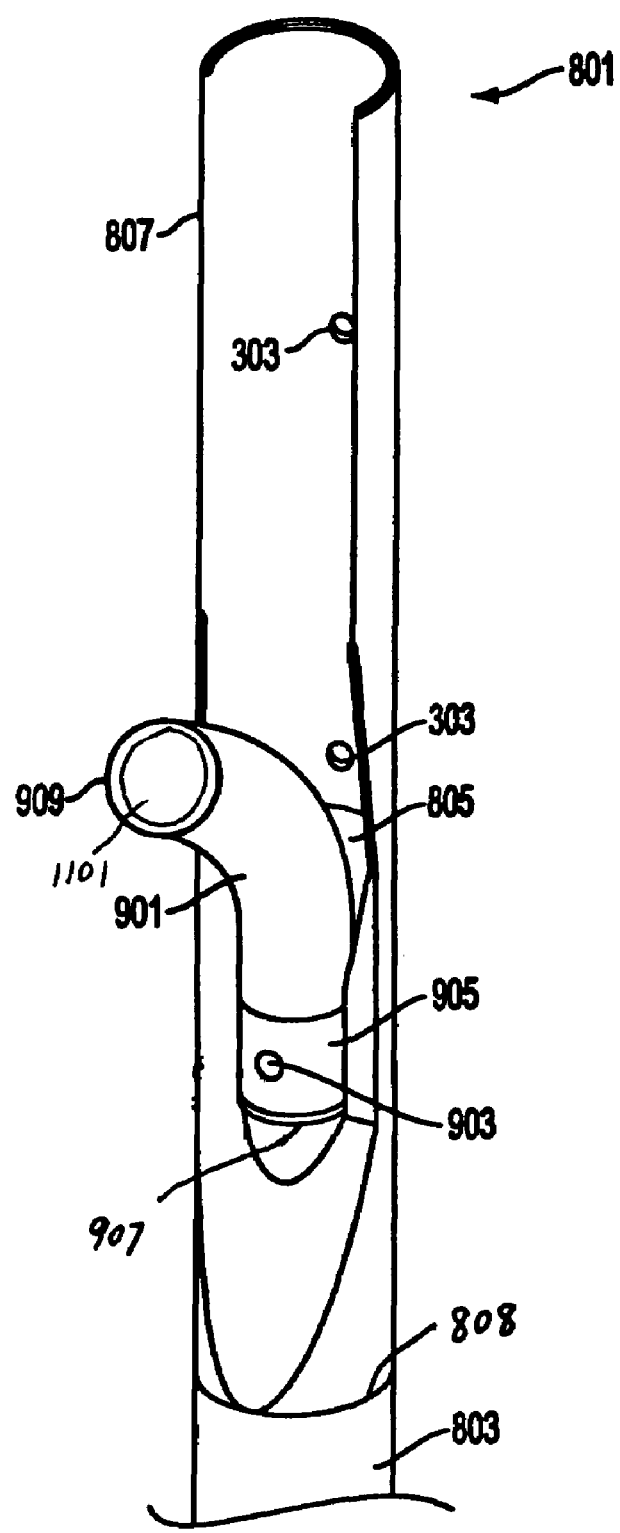
FIG. 9 illustrates a flexible member inserted into the joint socket portion.

Concave depression 805 accommodates a flexible member that can be joined to another structural member to be connected through the joint. FIG. 9 shows flexible member 901 as used with socket 801. Flexible member 901 inserts into the concave portion 805 of socket 801 and fastened into the socket. As shown in FIG. 9, one end of flexible member 901 is bolted or screwed in place (e.g., fixedly attached to the socket 801 of the non-moveable member) with bolt which passes through hole 903 in a mount ring 905. Mount ring 905 enhances the structural integrity of the flexible link and prevents the flexible link 901 from ripping away from the bolt connecting the flexible member to the socket 801. Those of ordinary skill will recognize that mount ring 905 could be built into the flexible member, or that the function of the mount ring could be replaced by appropriate reinforcement of the flexible member so that it connects to the socket without tearing under the stresses experienced by the joint. Those of ordinary skill will further recognize that the flexible member can be fastened to the socket by other means, such as gluing a portion of the flexible member to the socket, while remaining within the scope of the invention. According to the invention, it is only necessary that a first end 907 of the flexible member 901 be fastened to the socket 801 in such a manner that it does not fall out of the socket 801 under the anticipated stress, while the second end 909 of the flexible member 901 be free to move into and out of the socket 801. Referring to FIG. 8 and to FIG. 9, the non-end (middle) portion of the flexible member 901 is capable of movement within the transition regions 812, 813 of the socket 801, since the non-end portion is not directly fixedly attached to anything and since the flexible member 901 is flexible.

Figure 10:
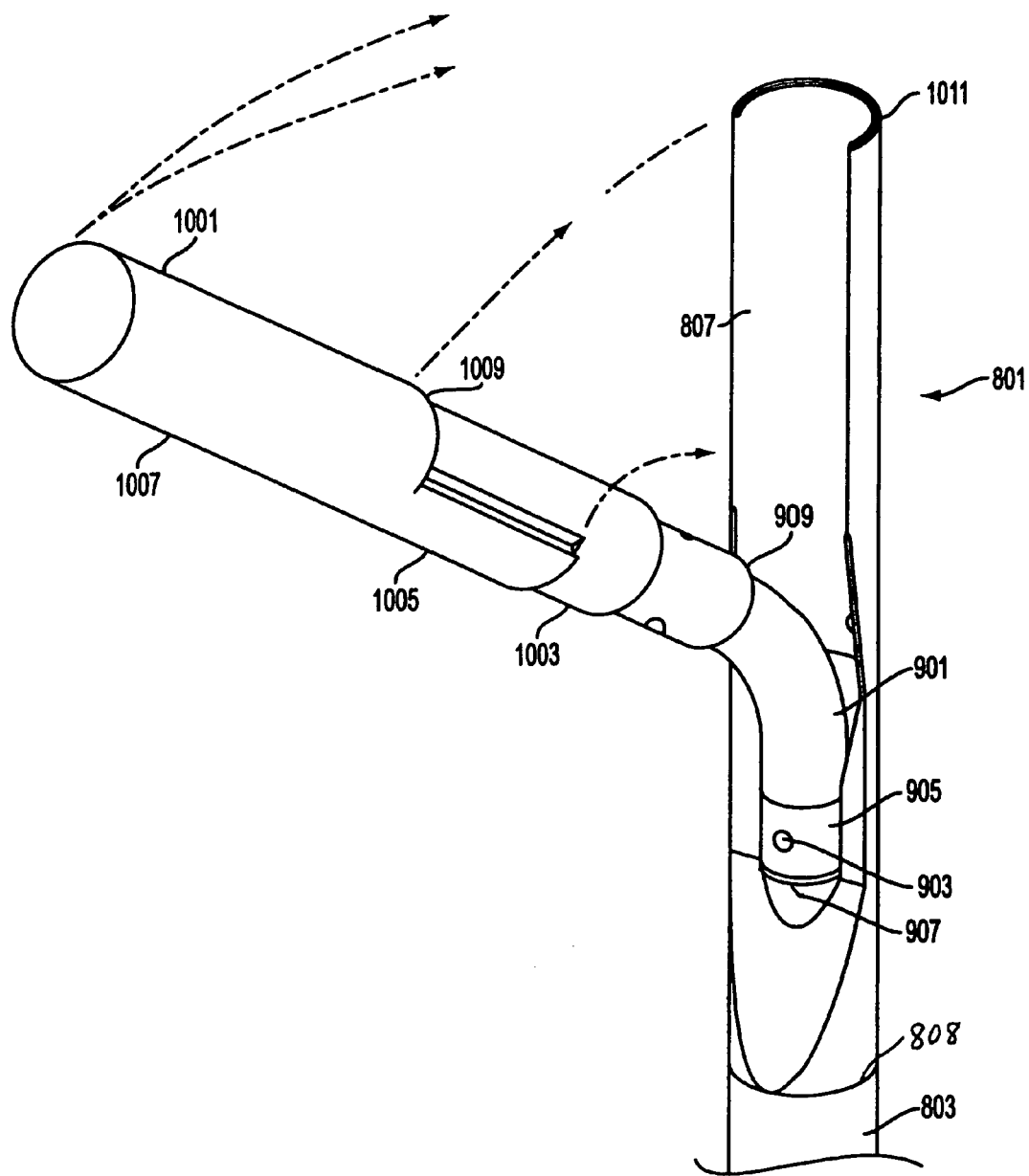
FIG. 10 illustrates a moveable member attached to the flexible member so that the moveable member can be inserted and removed from the joint socket according to the invention.

In use, the second end 909 of flexible member 901 connects to a moveable member 1001 that can move into and out of socket 801 as shown in FIG. 10. The flexible member 901 can flex and twist with respect to a non-moveable member that it is coupled to by way of a bolt provided through hole 903. In FIG. 10, the non-moveable member corresponds to the member that includes outer diameter portion 803, and also includes the socket 801 having sidewalls in the snap fit region 807. Moveable member 1001 is shown as a circular tubular structure, although other shapes can also be used for both the moveable member and the fixed member which forms the socket. Moveable member 1001 has a reduced outer diameter tube end 1003, an alignment portion 1005 and a full outer diameter portion 1007. The reduced outer diameter portion 1003 can be formed by swaging or crushing the entire circumference of a tube having an outer diameter that is the same as full outer diameter potion 1007. Thus, this connection to the joint 801 can be integral with the frame member being joined through the joint. Another advantage of the joint according to the invention is that both the socket 801 and the moveable member 1001 can be integrated with their respective frame members. Also, as shown in FIG. 10, the flexible member 901 is attached to the non-moveable member internal to a maximum outer diameter of the non-moveable member, whereby that maximum outer diameter is the diameter of outer diameter portion 803 in that figure.

Figure 10A:
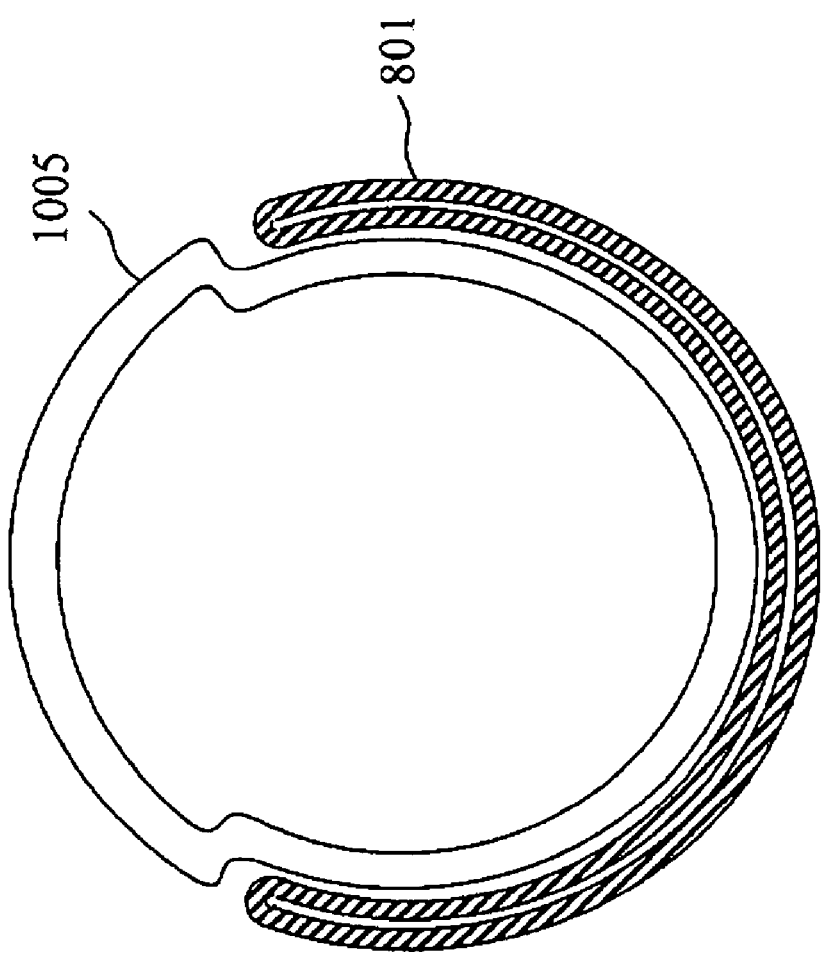
FIG. 10A is a side view illustrating the alignment portion of the moveable member.

FIG. 10 also illustrates alignment portion 1005 built into the moveable member 1001. Alignment portion 1005 is formed by swaging or crushing only a portion of the outer diameter of the tube. A more detailed view of the alignment portion is shown in the side view of FIG. 10A. The advantage to forming the alignment portion 1005 is that it causes the moveable member 1001 always to intersect with the socket 801 in a manner that aligns the moveable member 1001 with the socket 801. This alignment is possible because the flexible member not only moves into and out of the socket, but its flexibility allows it to twist as needed to conform its shape to achieve the alignment as necessary. This alignment aids in maintaining the structural integrity of the joint. This alignment also forms a substantially smooth surface around the circumference of the alignment portion 1005 of moveable member 1001 and socket 801. The proximate end portion 1009 of full outer diameter portion 1007 of the moveable member 1001 is sized to intersect the end portion 1011 of the snap fit section 807 of socket 801. As a result of the alignment accomplished in portion 1005, the outer diameter of section 1007 and the outer diameter of the alignment portion 1005 with snap fit portion 807 are substantially the same, forming a smooth transition between the mechanical joint and the frame member integrated with moveable member 1001.

FIG. 10 also illustrates the connection between flexible member 901 and moveable member 1001. Moveable member 1001 is generally formed of material having a tubular shape or a shape compatible with the shape of socket 801. End 909 of flexible link 901 inserts into the tube as shown in FIG. 10. The length of flexible member that inserts into the tube need only be sufficient to maintain a good connection with the moveable member 1001. As was the case with the connection between the flexible member 901 and the socket 801, the connection between one end of the flexible member 901 and the moveable member 1001 can be made by any method suitable for the stresses of the application, for example by gluing, crimping or bolting (e.g., fixedly attached). Similarly, if bolting or screwing techniques are used, the flexible member 901 can be reinforced at the connection with the moveable member to enhance its structural integrity either by integrating structure enhancing material into the flexible member or by other means. By way of illustration and not limitation, FIG. 10 shows flexible member 901 connected to the moveable member 1001 using a bolt, preferably reinforced by a mount ring, to thereby provide a fixed attachment.

Figure 11:
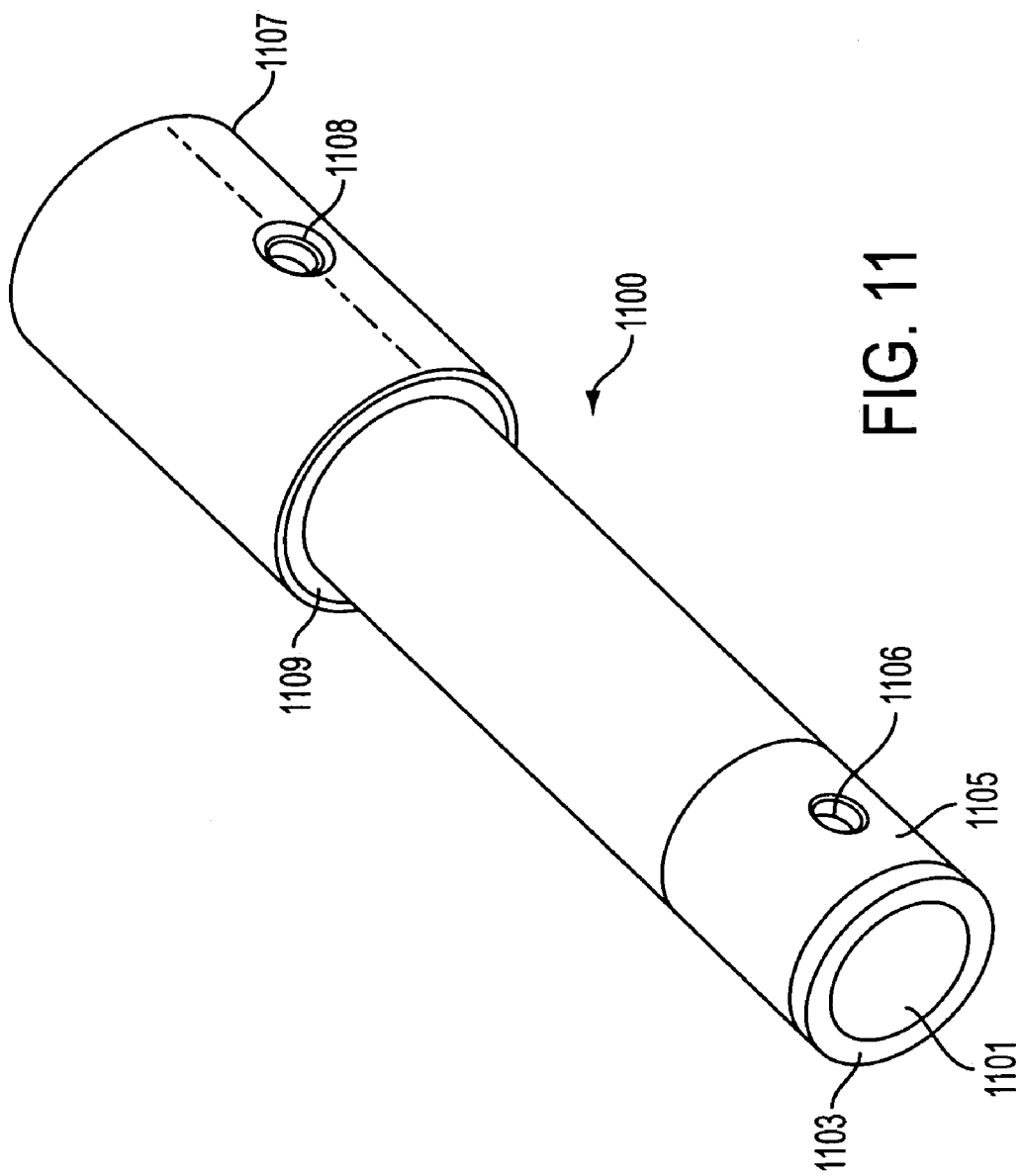
FIG. 11 shows details of the flexible member.

FIG. 11 illustrates an example of a flexible member, although those of ordinary skill will recognize that other flexible member implementations can be used while remaining within the scope of the invention. FIG. 11 also illustrates the use of mount rings for the additional purpose of assembling the flexible member. The flexible member 901 in FIG. 11 has an internal cord 1101 formed, for example, from a solid piece of EPDM rubber. Surrounding the central cord 1101 is a sheathing of hose, such as hot water heater hose 1103. This hot water heater hose protects the rubber core from damage resulting from exposure to ultraviolet radiation and from other mechanical damage that may occur during the remaining assembly steps. Hot water heater hose sheathing 1103 is also useful for its textile reinforcement, which prevents rips and tears from propagating to the entire hose. As seen in FIG. 11, the sheathing 1103 surrounds an entire longitudinal outer surface of the internal cord 1101. A reinforcing member, such as mount ring 905, provides structural integrity to the one end of the flexible member. Similarly, mount ring 1007 provides structural integrity to the other end of the flexible member. These mount rings are typically metal or other reinforcing material that will not tear away from the mounting structure used to attach the flexible member to the socket and moveable member. For example, mount rings (which correspond to metal bands in one embodiment) 905 and 1107 are shown with bolt holes 1106 and 1108, for connecting to the socket and moveable member, respectively. The mount rings are swaged or squeezed around the components of the structural member and therefore also function to assist in holding the internal components of the flexible member 901 together. Often the dimensions of the connection to the socket and the connection to the moveable member differ. FIG. 11 shows spa-flex hose 1109 or other application suitable material used to take up the space between the outer diameter of the assembly and the inner diameter of mount ring 1107. When one end of the flexible member 901 is attached to the socket 801, as seen in FIG. 9, the unattached end of the flexible member 901 is capable of movement along three degrees of motion with respect to the socket 801.

Figure 12:
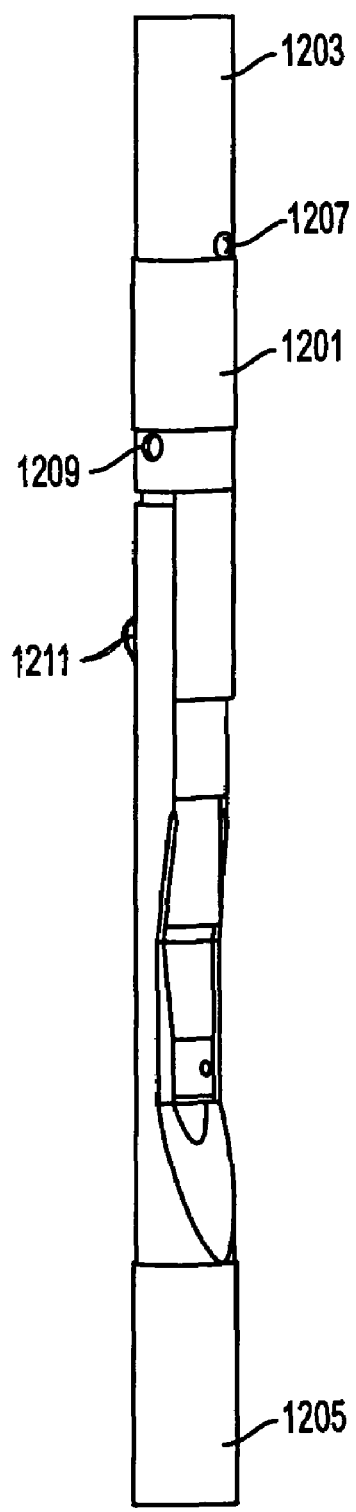
FIG. 12 shows various details of a joint according to the invention with a moveable member and joint socket engaged.

FIG. 12 illustrates optional additional parts of a joint according to the invention, including a sleeve 1201. As shown in FIG. 12, two frame members 1203 and 1205 are engaged such that they are linked together, most typically in an assembled position. Those of ordinary skill will recognize, however, that the joint according to the invention merely links to members in either of two positions, a first position in which the moveable member is engaged in the socket and a second position in which the movable member is not engaged in the socket. Although the first position suggests an assembled state and the second position suggests a collapsed state, the joint according to the invention can be used in circumstances where either position in a particular structure represents an assembled or collapsed state.

Returning to FIG. 12, sleeve 1201 is shown between up stop 1207 and down stop 1209 such as a double detent spring. Another detent spring not shown protrudes out the opposite side of the joint. One such device is a model D181 detent made by Valco Valley Tool & Die. In the open position, the detent spring 1209 prevents lock sleeve 1201 from going out of position when the moveable member is disengaged from the socket. The up stop, 1207 prevents the lock sleeve from moving out of position in the opposite direction. A down stop 1211 prevents lock sleeve 1201 from dropping past the socket on the opposite end.

Figure 13:
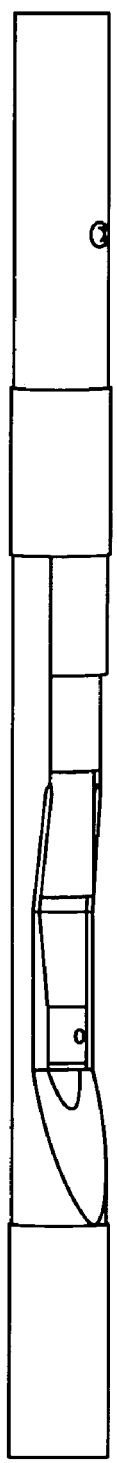
FIG. 13 illustrates a joint according to the invention with a moveable member and a joint socket engaged in a locked position.

FIG. 13 illustrates conditions when lock sleeve 1201 is engaged. As FIG. 13 illustrates, lock sleeve 1202 slides down over the detent spring to form a relatively consistent outer diameter surface in the engaged position. Referring now to FIGS. 10 and 13, the sleeve 1201 has a substantially smooth exterior surface and is positionable to a location where the moveable member 1001 is engaged with the socket 801.

Figure 14:
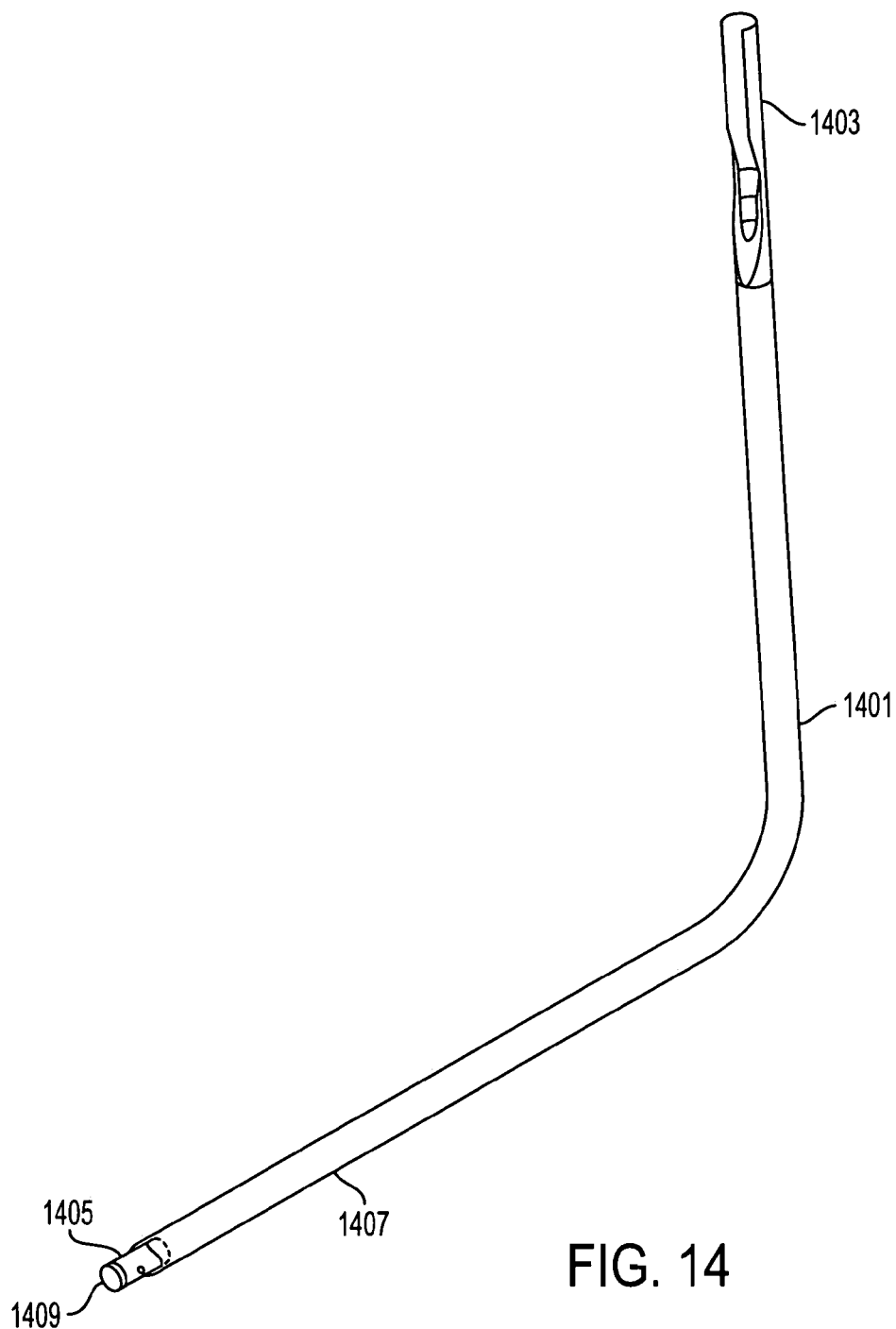
FIG. 14 illustrates an L-shaped structural member formed with a joint socket portion at one end thereof and a moveable member at a second end thereof.

FIG. 14 illustrates an L-shaped frame member 1401 with a socket portion 1403 integrated into one end and a moveable member 1405 integrated into a second end. The moveable member will move in and out of a socket when the L-shaped member is assembled with other members into a frame. Any combination of sockets and moveable members can be integrated into frame members to be linked to other frame members. In addition sockets and moveable members can be formed as individual units to be connected to frame members by any suitable means. Moveable member 1405 is formed with a smaller outer diameter than the frame element 1407. A rubber stopper 1409 in the moveable member provides additional strength.

Figure 15:
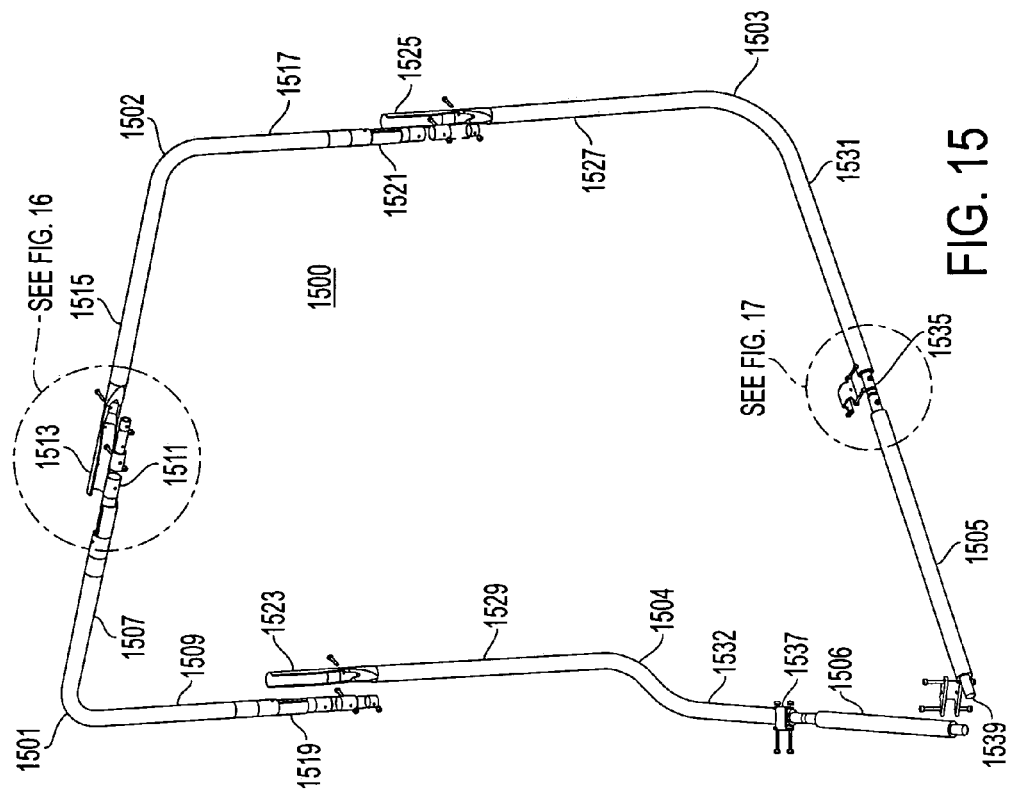
FIG. 15 illustrates a lacrosse goal frame formed using structural members with joints according to the invention.
Figure 16:
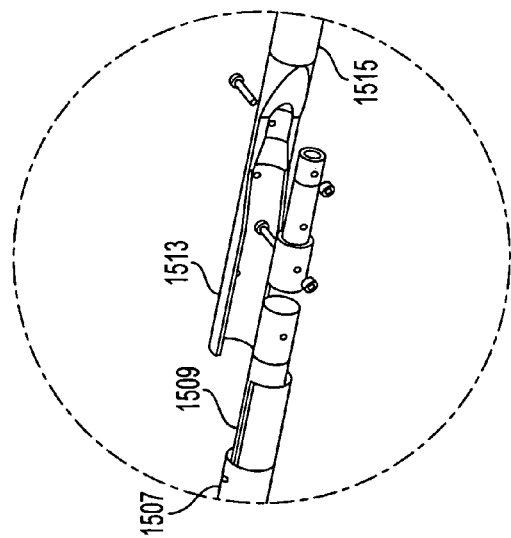
FIG. 16 shows an exploded view of a joint in FIG. 15.

FIG. 15 illustrates one possible arrangement for forming a game goal, such as a lacrosse goal, shown generally at 1500. FIG. 15 is by way of illustration and not limitation, as those of ordinary skill will recognize that an almost infinite variety of such devices can be formed using a joint according to the invention. The goal in FIG. 15 has four elbows 1501, 1502, 1503 and 1504, each having a frame element extending from each side of the elbow in a direction appropriate to the shape of the goal. Preferably, the frame members are integrated with the elbows, although the elbows and frame members can be formed separately and connected together without departing from the scope of the invention. Two straight members 1505 and 1506 are also used in the structure. Frame element 1507 extending from elbow 1501 is used as part of a top crossbar of goal 1500 and is configured at its end to form a moveable member according to the invention 1511 that moves into and out of a socket portion according to the invention 1513 at an end of a fixed frame member 1515. An exploded view of this arrangement is shown in FIG. 16. Member 1515 forms a second portion of the crossbar and is connected or integral with elbow 1502. Both elbows 1501 and 1502 have upright portions 1509 and 1517 extending therefrom. These move into and out of socket portions 1523 and 1525, respectively, in the engaged and disengaged positions, depending on whether the goal is configured for use or collapsed for transport. As illustrated in FIG. 15, these upright portions each have a moveable member 1519 and 1521, respectively, at their ends. In this way, FIG. 15 illustrates that according to the invention a structural member can have the same kind of joint portion at either end, as shown by the moveable portions 1511 and 1519 at the ends of both frame elements extending from elbow 1501, or different joint portions at either end, as shown by the socket portion 1513 at the end of one frame element 1515 extending from elbow 1502 and the moveable portion 1521 at the end of the other frame element 1517 extending from elbow 1502. Elbows 1503 and 1504 have upright frame elements 1527 and 1529 with socket ends 1523 and 1525, respectively. Ground frame elements 1531 and 1533 are also connected to or integral with elbows 1503 and 1505, as shown in FIG. 15. Frame elements 1531 and 1532 connect to straight frame members 1505 and 1506, which are used as ground members, through bracket joints 1535 and 1537. The straight members connect at a point 1539 required for the shape of a lacrosse goal through another bracket joint.

Figure 17:
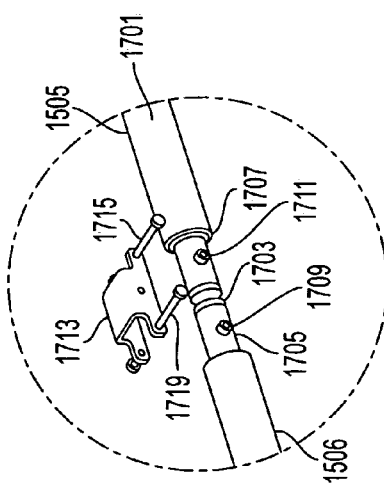
FIG. 17 shows a bracket joint.

FIG. 17 illustrates a bracket joint 1701 which acts as a hinge that can be make a straight connection or a connection in a wide variety of positions. A flexible member 1703, such as a flexible member previously disclosed herein or other flexible member as may be appropriate to the application, extends between end portions of the members 1505 and 1506. Reinforcing rings 1705 and 1707 may also be used. Bolt holes 1709 and 1711 are used with generally U-shaped bracket 1717 and bolts 1715 and 1717 to maintain the bracket joint in the desired position. After the assembly is placed into the desired configuration by allowing the flexible member to be a straight connection between the frame elements, as shown at 1535 and 1527 or bending the flexible member to the desired position, as shown at point joint 1539, bracket 1713 is screwed to the joint with bolts 1715 and 1717 through holes 1707 and 1709 to hold the joint in position.

Figure 18:
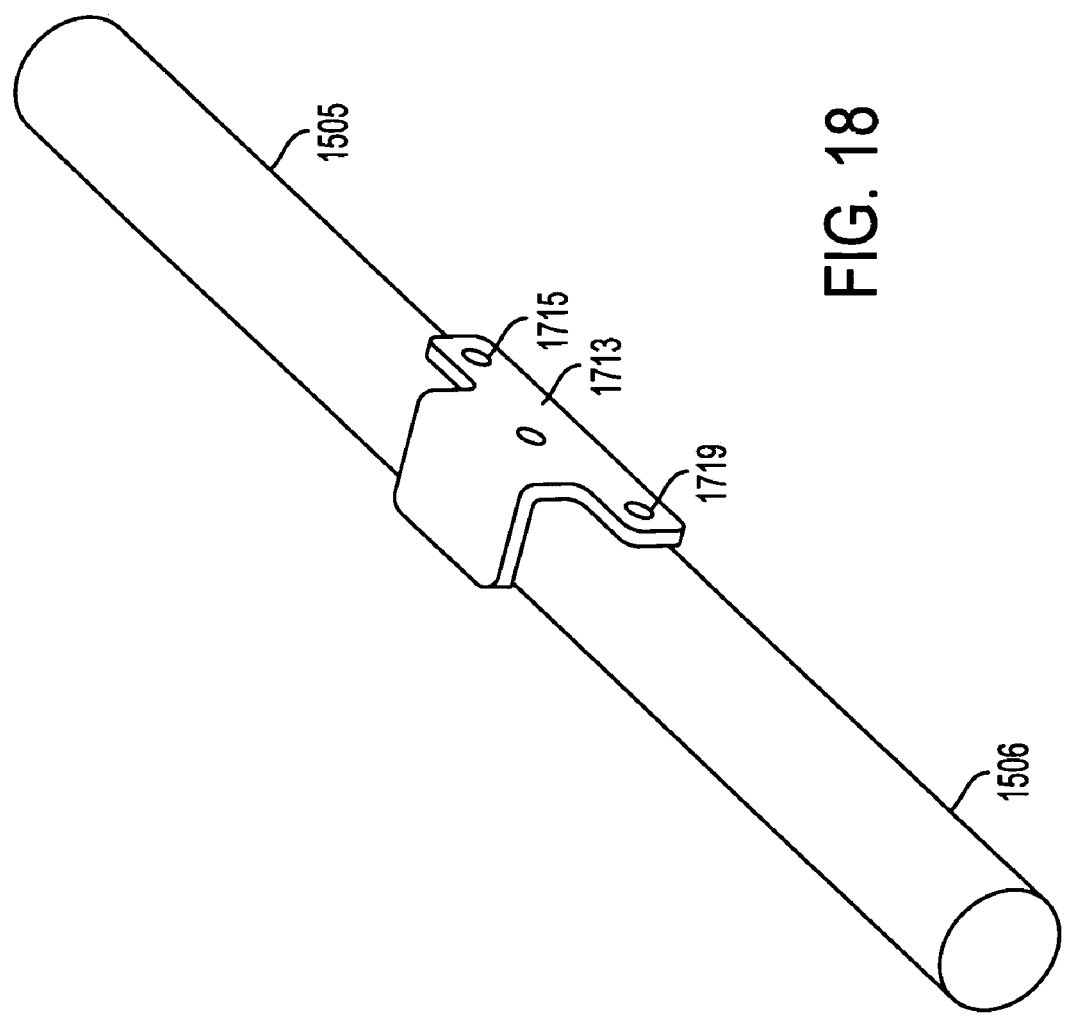
FIG. 18 shows an assembled bracket joint.

FIG. 18 illustrates the bracket joint 1701 in the assembled condition.

Figure 19:
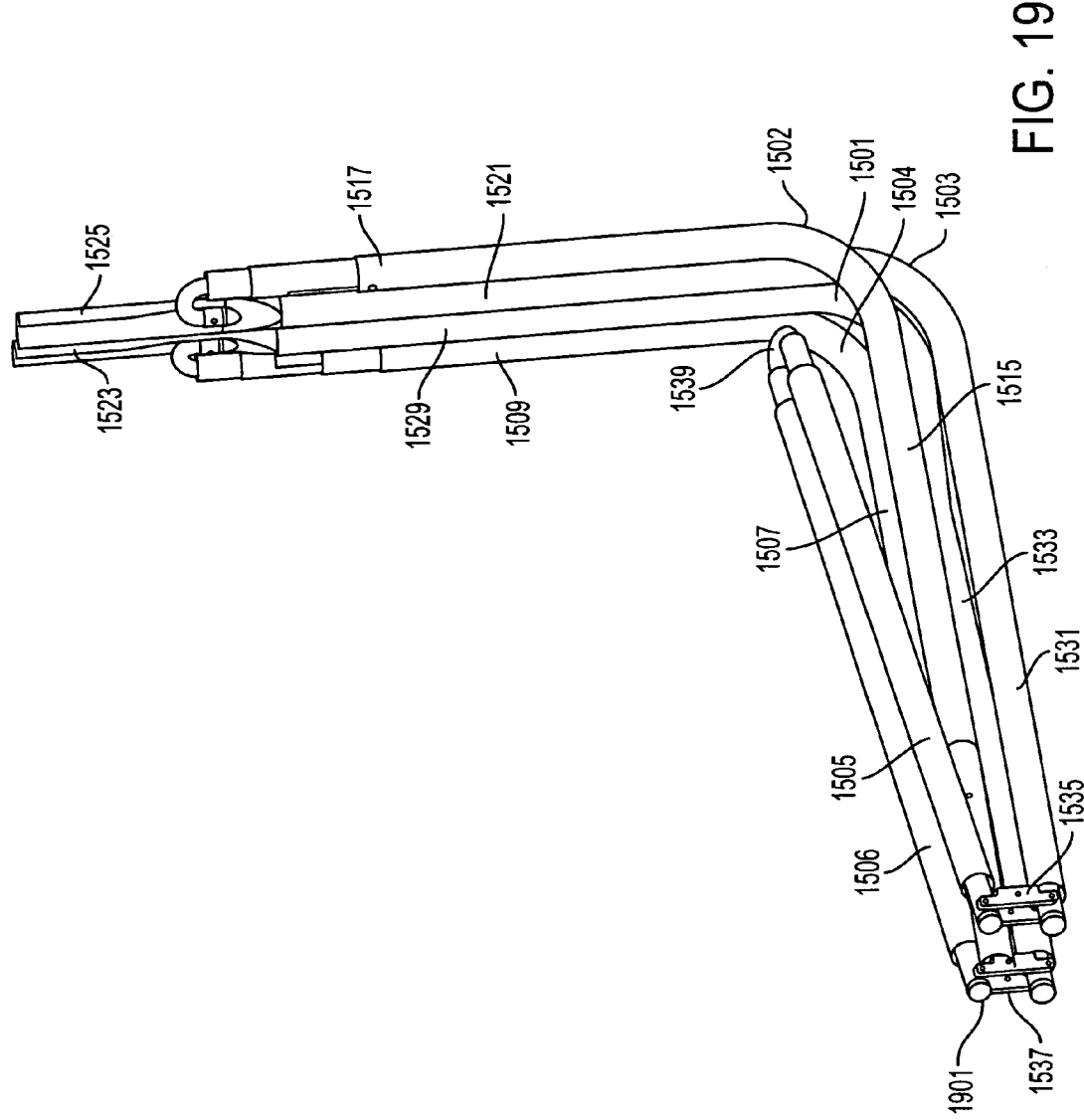
FIG. 19 illustrates the lacrosse goal of FIG. 15 in a collapsed position.

FIG. 19 illustrates the goal of FIG. 15 in a collapsed position. Note that in the collapsed configuration straight ground members 1505 and 1506 fold toward elbows 1503 and 1504 thereby minimizing the size of the apparatus when collapsed. The goal thus folds into an easily transported L-shape. Rubber stoppers 1901 can be inserted into the ends portions of the frame members at bracket joints 1535 and 1537 to add structural integrity at the reduced diameter portion at the end of the frame element connected to thereto.

Figure 20:
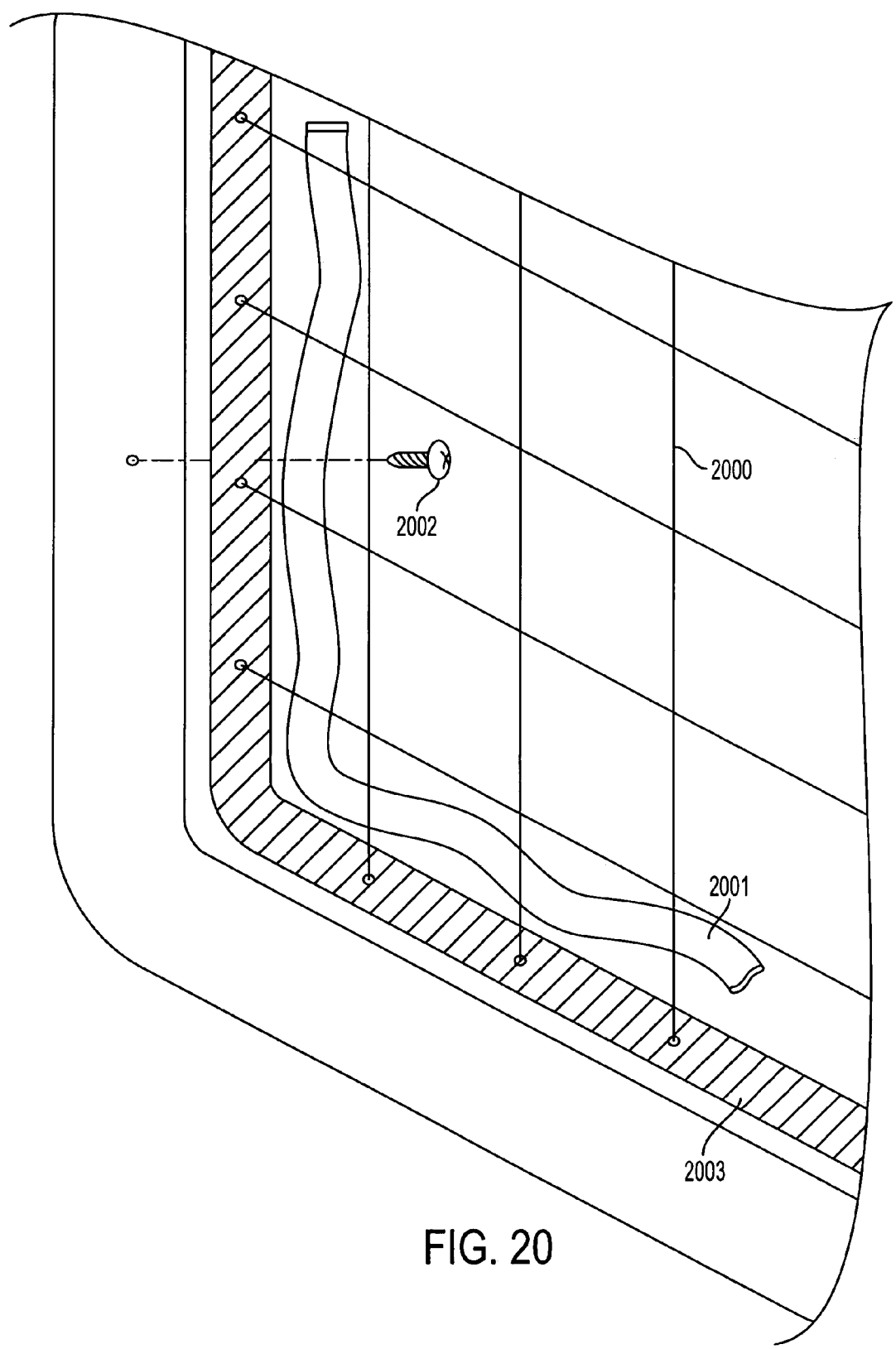
FIG. 20 illustrates a net connected to the frame of the goaling in FIG. 15.

FIG. 20 shows a fastener, such as self tapping screw 2002 connecting a net 2000 having a hem 2003 to the frame through fastener strap 2001. Fastener strap 2001 is woven around the net 2000.

Those of ordinary skill will recognize that variations in the shape, size and other aspects of the elements according to the invention can be utilized without departing from the scope of the invention as recited in the claims herein.

What is claimed is:
1. A mechanical joint comprising:
   a hollow structure having wall portions thereof brought together forming a socket; and
   a flexible, twistable member having a first end fastened in said socket, said flexible, twistable member including a rubber section that enables said flexible, twistable member to be flexed and twisted,
   said hollow structure comprising a tube,
   said socket comprising portions of said tube brought together forming a double wall,
   wherein the flexible, twistable member has a second end that is capable of movement along three degrees of motion with respect to said socket,
   said double wall being continuous,
   said socket having a fitted region with a curvature such that a width of an opening of said socket is smaller than a maximum inner width of said socket.
2. A mechanical joint as recited in claim 1, said fitted region providing a snap fit with a moveable member placed in said socket.
3. A mechanical joint as recited in claim 1, said socket further comprising a transition region adjacent said fitted region, said transition region having an opening therein.
4. A mechanical joint as recited in claim 1, wherein the flexible, twistable member includes a metal band, and wherein the first end of said flexible, twistable member is securely fastened in said socket by putting a fastening device through a hole in said metal band and through a hole in an outer circumferential portion of said socket.
5. A mechanical joint comprising:
   a hollow structure having wall portions thereof brought together forming a socket; and
   a flexible, twistable member having a first end fastened in said socket, said flexible, twistable member including a rubber section that enables said flexible, twistable member to be flexed and twisted,
   said hollow structure comprising a tube,
   said socket comprising portions of said tube brought together forming a double wall,
   wherein the flexible, twistable member has a second end that is capable of movement along three degrees of motion with respect to said socket,
   wherein, when flexed and/or twisted, the second end of said flexible, twistable member can move into or out of a fitted region in said socket, said socket further including a transition region within which the first end of said flexible, twistable member is affixed, and the first end is fastened to said socket such that the first end cannot move out of said socket.
6. A mechanical joint as recited in claim 5, further comprising a moveable member,
   wherein said second end of said flexible, twistable member is connected to said moveable member.
7. A mechanical joint as recited in claim 6, wherein said fitted region has a width to provide a snap fit with said moveable member when said flexible, twistable member moves into said socket.
8. A mechanical joint as recited in claim 5, said flexible, twistable member comprising a plurality of members surrounding each other, wherein one of the plurality of members corresponds to said rubber section.

9. A mechanical joint as recited in claim 6, said moveable member being an integrated portion of a structural member of an assembly.

10. A mechanical joint as recited in claim 5, wherein said fitted region includes an opening for accepting a fastening means, wherein the first end of said flexible, twistable member is fixedly attached to said socket at said fitted region by way of the fastening means.

11. The mechanical joint according to claim 5, further comprising a fastening device for fastening the first end of said flexible, twistable member in said socket.

12. The mechanical joint according to claim 11, wherein said fastening device includes a bolt.

13. A mechanical joint comprising:
a hollow structure having wall portions thereof brought together forming a socket;
a flexible, twistable member having a first end fastened in said socket, said flexible, twistable member having a second end; and
a moveable member, wherein said second end of said flexible, twistable member is connected to said moveable member,
said hollow structure comprising a tube,
said socket comprising portions of said tube brought together forming a double wall,
wherein, when flexed and/or twisted, the second end of said flexible, twistable member can move into or out of a fitted region in said socket, said socket including a transition region within which the first end of said flexible, twistable member is affixed, and the first end is fastened to said socket such that the first end cannot move out of said socket,
said fitted region having a width to provide a snap fit with said moveable member when said flexible, twistable member moves into said socket,
said socket mates with an alignment portion of said moveable member to form a substantially smooth exterior surface at an intersection of said moveable member and said socket.

14. A mechanical joint as recited in claim 13, wherein said socket that mates with said alignment portion receives said moveable member having a swagged portion.

15. A mechanical joint as recited in claim 13, further comprising a sleeve that locks said socket in engagement with said moveable member.

16. A mechanical joint as recited in claim 15, further comprising an up stop and down stop maintaining said sleeve in a set position.

17. A mechanical joint as recited in claim 15, said sleeve having a substantially smooth exterior surface and being positionable to a location where said moveable member is engaged with said socket.

18. A mechanical joint comprising:
a structure having a wall that forms a socket; and
a flexible, twistable member having a first end fastened in said socket,
wherein, when flexed and/or twisted, the second end of said flexible, twistable member can move into or out of a fitted region in said socket, said socket including a transition region within which said first end of said flexible, twistable member is affixed,
wherein said second end of said flexible, twistable member connects to a moveable member,
wherein said wall of said structure has a width to provide a snap fit with said moveable member when said flexible, twistable member moves into said socket,
wherein said socket has a concave depression that mates with an outer circumferential surface of the first end of said flexible, twistable member, and
wherein said socket mates with an alignment portion of said moveable member to form a substantially smooth exterior surface at an intersection of said moveable member and said socket.

19. A mechanical joint as recited in claim 18, said socket portion that mates with said alignment portion receives said moveable member having a swagged portion.

20. A mechanical joint as recited in claim 18, further comprising a sleeve that locks said socket in engagement with said moveable member.

21. A mechanical joint as recited in claim 20, further comprising an up stop and down stop maintaining said sleeve in a set region.

22. A mechanical joint as recited in claim 20, said sleeve having a substantially smooth exterior surface and being positionable to a location where said moveable member is engaged with said socket, so as to create a relatively consistent outer diameter surface for said mechanical joint.

23. A mechanical joint comprising:
a flexible, twistable member that flexes and twists with respect to a non-moveable member that the flexible, twistable member is fixedly attached to;
wherein the non-moveable member is fixedly attached to a first end of the flexible, twistable member,
a moveable member that is fixedly attached to a second end of the flexible, twistable member;
wherein the flexible, twistable member enables movement of the moveable member along three degrees of motion with respect to the non-moveable member; and
a sleeve slidable on the moveable member, the sleeve being capable of sliding over an outer diameter of a socket of the non-moveable member, to allow the moveable member to be fixedly attached to the non-moveable member,
wherein said moveable member includes a reduced diameter portion and a full diameter portion in a snap-fitted region where said non-moveable member and said moveable member are snap-fitted to each other.

24. A mechanical joint as recited in claim 23, wherein, in an engaged position, the sleeve and the snap-fitted region have relatively consistent outer diameter surfaces.

* * * * *